US007699593B2

(12) United States Patent
Brussel et al.

(10) Patent No.: US 7,699,593 B2
(45) Date of Patent: Apr. 20, 2010

(54) HYDRAULIC PRESS FOR SYNTHETIC AND METAL PROCESSING

(75) Inventors: Richard Brussel, Sulzfeld (DE); Armin Seitz, Gemmingen (DE)

(73) Assignee: Dieffenbacher GmbH + Co. KG, Eppingen (DE)

( * ) Notice: Subject to any disclaimer, the term of this patent is extended or adjusted under 35 U.S.C. 154(b) by 73 days.

(21) Appl. No.: 11/729,865

(22) Filed: Mar. 30, 2007

(65) Prior Publication Data

US 2007/0292548 A1 Dec. 20, 2007

(30) Foreign Application Priority Data

Mar. 31, 2006 (DE) ...................... 10 2006 015 022

(51) Int. Cl.
*B29C 43/02* (2006.01)

(52) U.S. Cl. .......................... 425/78; 425/150; 425/355

(58) Field of Classification Search .................. 425/78, 425/149, 150, 352, 354–355
See application file for complete search history.

(56) References Cited

U.S. PATENT DOCUMENTS 4,260,346 A * 4/1981 Anderson et al. ............. 425/78
4,304,540 A 12/1981 Hammon
5,906,837 A * 5/1999 Link et al. .................... 425/78

FOREIGN PATENT DOCUMENTS

| | | | |
|---|---|---|---|
| DE | 36 37 544 | A1 | 5/1988 |
| DE | 36 37 545 | A1 | 5/1988 |
| DE | 200 20 007 | U1 | 4/2001 |
| DE | 10 2004 040 512 | A1 | 2/2006 |
| EP | 1 256 396 | A1 | 5/2001 |

* cited by examiner

*Primary Examiner*—Tim Heitbrink
*Assistant Examiner*—Thu Khanh T Nguyen
(74) *Attorney, Agent, or Firm*—Foley & Lardner LLP

(57) ABSTRACT

A hydraulic press can include a press frame with a press table arranged thereto and a traveling press platen arranged therein, in which at least one rapid motion cylinder with a platen connection can be arranged for the rapid no-load stroke of the press platen, in which at least one working cylinder with a piston directed toward the press table can be rigidly arranged on the upper crosshead of the press frame, in which a coupling device and opposed thereto a crosshead with at least one positioning and synchronizing cylinder for the piston can be arranged on the piston toward the press table, in which the piston can include a centrically arranged cylindrical extension for the sliding guide of a connecting device, such as a toothed rack, in which this connecting device can be connected to the press platen.

21 Claims, 4 Drawing Sheets

HYDRAULIC PRESS FOR SYNTHETIC AND METAL PROCESSING

The present invention relates to a hydraulic press for plastics and metal processing.

BACKGROUND

High-speed hydraulically operated presses for plastics and metal processing are known, in which these machines are designed for varying tool heights and opening strokes. For example, the working cylinder stroke can be large enough that, depending on the tool use in the clearance between the press table and the press platen, the maximum tool height (a large gap between the mounting plates of the press table and the press platen) to be expected can be used both with a stroke necessary for the maximum tool height and a very small tool height (small gap between the mounting plates of the press table and the press platen). Due to a necessary oil column of up to 2.5 meters, the corresponding working surface, and the high specific processing pressure in the tools, such types of presses have a very large oil volume in the working cylinders. Aside from a large compression volume, such types of presses also result in economic disadvantages during their operation.

There are now various approaches for limiting the no-load stroke of the working cylinder for different tool applications and nevertheless ensuring a high flexibility of the press with short change-over times. For example presses are known according to DE 36 37 544 A1 and DE 36 37 545 A1, in which, with frictionally engaged clamps on the steel columns (round or square shape), the working stroke is supposed to be reduced to a so-called short stroke with the least compression volume. However, these frictionally engaged connections have not proven worthwhile in practice or are too expensive.

Of course, there also are a plurality of other mechanical solutions for a height adjustment of long stroke presses in prior art. Systems where the force is transmitted likewise with short-stroke working cylinders, such as in injection molding machines with retractable crossbars, have not proven worthwhile because of the large pressing plates to be moved, the great distances, and a prolongation of the cycle time resulting therefrom.

A possible remedy lies in DE 10 2004 040 512 A1, in which a rotary table with a driving shaft and four legs is in each case provided between a short stroke piston and the legs of the press platen. The legs are adjustably arranged by means of a rotary drive of the driving shaft and a torque angle, either in a power transmission position onto the hook suspension faces of the web plates or in an opening position between the web plates of the press platen.

In U.S. Pat. No. 4,304,540 A, a press executed with columns is known, in which the press platen moves on several externally arranged columns. The working cylinders are arranged in the press table and clamping jaws are accommodated above the press platen that connect the press platen to the columns in an interlocking manner after bridging the no-load stroke and consequently close the flux for the pressing procedure. The control of the flux has proven disadvantageous for the most part because the flux diversion takes place in the grating of the columns so that the peaks of the load have to be diverted in notched machine elements. The gratings of the columns are also freely accessible and consequently exposed to possible contamination. The clamping of the columns takes place at stoppage.

Aside from the mechanical alternatives, an attempt was made to shorten the no-load stroke via other drives, such as for instance, electrically operated intermediate drives.

The disadvantage arising here is that spikes of several hundred amperes occur in the driving motors, because the drives used must move heavy loads rapidly and usually without intermediate gear ratios (as in crane loads). It is such types of spikes that are measured by electricity suppliers and charged high surcharges when calculating the electric bill. The surcharges for massive peak loads such as these are so high that they significantly affect the economics calculation for a press. In addition, the appropriate power supplier may impose upon the operator to install devices for damping the peak loads for the supply network, which in turn incur high acquisition and maintenance costs.

Thus, the following disadvantages arise in the known prior art:

a) large hydraulic oil quantities must be moved in long stroke presses, which result in increased expenditure of energy and increased wear and tear of the hydraulic elements (oil consumption, pumps, valves), b) in mechanical no-load stroke bridging, to avoid the disadvantages in a), there are awkward clamps that impair the closing speed of the press and prolong the working cycle, c) mechanical no-load stroke bridging is normally subject to increased wear due to unfavorable fluxes in the mechanical clamp, d) the columns or connecting devices for the engagement of the mechanical clamping elements are normally unprotected and open to normal contamination in the workshop halls, and e) no-load stroke bridging by means of electric drives result in high spikes that are disadvantageous to the profitability of the operation and increased control engineering requirements with regard to the energy supply.

SUMMARY

An object is to create a hydraulic press that can provide short cycle times and a rapid, variably adjustable no-load stroke bridging. The hydraulic press can be used for plastics or metal processing.

According to an embodiment, a hydraulic press can comprise a press frame with a press table arranged thereon and a traveling press platen arranged therein, wherein rapid motion cylinders with a platen connection are arranged for the rapid no-load stroke of the press platen, in which the working cylinder(s), with the piston directed toward the press table, are rigidly arranged on the upper crosshead of the press frame, in which a coupling device and, opposed thereto, a crosshead with a positioning and synchronizing cylinder for the piston are arranged on the piston toward the press table, in which the piston exhibits a centrically arranged cylindrical extension for the sliding guide of a connecting device, in which this toothed rack is connected to the press platen.

According to an embodiment, a hydraulic press for plastics or metal processing is provided, comprising a press frame having a press table arranged thereon and a traveling press platen arranged therein, wherein rapid motion cylinders with a platen connection are arranged for the rapid no-load stroke of the press platen, in which at least one working cylinder with piston directed toward the press table is rigidly arranged on the upper crosshead of the press frame, in which a coupling device and opposed thereto a crosshead with positioning and synchronizing cylinders for the piston are arranged on the piston toward the press table, in which the piston exhibits a centrically arranged cylindrical extension for the sliding guide of a toothed rack, in which this toothed rack is connected to the press platen.

According to another embodiment, a hydrostatic bearing is further provided for the balancing of moments that is arranged to connect the toothed rack to the press platen.

According to another embodiment, the parallel hold of the press platen to the press table parallel holding cylinders is arranged on the press frame and distance elements are arranged on the press platen corresponding hereto.

According to another embodiment, the working cylinder is designed as a differential cylinder.

According to another embodiment, wherein a sleeve is arranged between the coupling device and the press platen for the toothed rack. According to a further embodiment, the sleeve preferably a telescopic or foldable.

According to another embodiment, wherein to protect the toothed rack, the appropriate guide in the piston, and its extension, this region is encapsulated and provided with air filters.

According to another embodiment, at least two control loops are arranged to regulate synchronization, in which one control loop is formed from the positioning and synchronizing cylinders for each working cylinder, together with the appropriate position sensor device for each working cylinder; and the second control loop is formed from the rapid motion cylinder on the press platen, together with the position sensor device.

According to another embodiment, at least two control loops are arranged to regulate synchronization, in which one control loop each per working cylinder is formed together with the appropriate position sensor device for each working cylinder and a second control loop is formed from the rapid motion cylinder on the press platen together with the position sensor device.

According to an embodiment, a hydraulic press for plastics and metal processing comprises a press frame including a press table and a traveling press platen, at least one rapid motion cylinder, wherein the rapid motion cylinder is arranged for rapid no-load stroke of the press platen, at least one working cylinder with a piston configured to move toward the press table, a connecting device that is connected to the press platen, and a coupling device arranged to couple with the connecting device, wherein the piston is configured to be accelerated in order to be synchronized with the connecting device, wherein the coupling device is configured to close with the connecting device when the synchronization occurs.

Embodiments of a press described herein facilitate a rapid closing procedure of the press, in which even during the movement of the press platen in the rapid no-load stroke or during the braking phase, the coupling process is performed and the working stroke can be performed without delay. This means that the press platen need not be stopped for the coupling process and this may go over directly from a reduced rapid motion speed into the main press phase. This is achieved in an advantageous manner through the hydraulic adjustment of the closing travel between the rapid motion cylinders of the press platen and the working cylinder for the working stroke and/or the positioning and synchronizing cylinders, which with the aid of the position and speed information of the particular position sensors facilitate a simple synchronization of the coupling device to the toothed rack. This advantageously results in an automatic, centrally adjustable setting option for the variably definable tool heights, without having to insert adaptors or mechanical elements to the tools. Accordingly, full automation of a press working line or of a press for the automatic charging with different tools without manual adjustment of the no-load stroke distance is possible.

Significant energy savings arise through the short stroke of the working cylinder on account of the low compression volume and the quantity of hydraulic fluid in comparison with prior art. Since the working cylinders normally have to be designed for large volume, there is already great potential for energy savings in an application with short press platen no-load stroke with small-volume rapid motion cylinders. The savings effect is additionally strengthened by lesser quantities of circulating oil, which must be changed regularly. Even a low refrigeration capacity, due to lower installed engine power and a lower amount of circulating hydraulic oil quantities, significantly contributes to an economical operation of a hydraulic press. Furthermore, there are other advantages with respect to the susceptibility of the hydraulic elements to breakdown since wear on the valve technology, the hydraulic conduits, and other machine elements involved is also reduced. A short pressure build-up time in the working cylinder is advantageously achieved in the process because this need not be compressed first for the pressure build-up because of the low existing oil volume.

The arrangement of the mechanical coupling with a coupling device combined with a toothed rack arranged centrically in the piston of the working cylinder provides advantages with respect to flux during the pressing. The flux is not diverted in the coupling device or the catching elements of the toothed rack, as is the case for towing bars, but may flow in a straight line in the form of continuous compressive strains, which facilitates a simplified geometric formation together with a constructionally secure layout of the catching elements for the mechanical coupling.

Moreover, the guide of the toothed rack in the cylindrical borehole of the piston of the main cylinder simultaneously offers a casing for the catching elements and provides protection against damaging environmental impact. In the open state of the press, during maintenance work or stoppage, the toothed rack is completely protected in the interior of the piston and its extension and is not exposed to any unnecessary contamination even when the tool is changed or during stoppage necessitated by operation. To ensure this effect even during operation, there is also the possibility of providing a telescopic casing or the like between the press platen and coupling device. In a complete casing of the toothed rack and its guide it would be necessary, due to the different gas volume in an open and closed press, to filter the air that enters this casing.

Other advantageous measures and embodiments follow from the subordinate claims and the following description with the drawing.

BRIEF DESCRIPTION OF THE DRAWINGS

These and other features, aspects, and advantages will become apparent from the following description, appended claims, and the accompanying exemplary embodiments shown in the drawings, which are briefly described below.

DETAILED DESCRIPTION

Embodiments will be described below with reference to the drawings.

Figure 1:
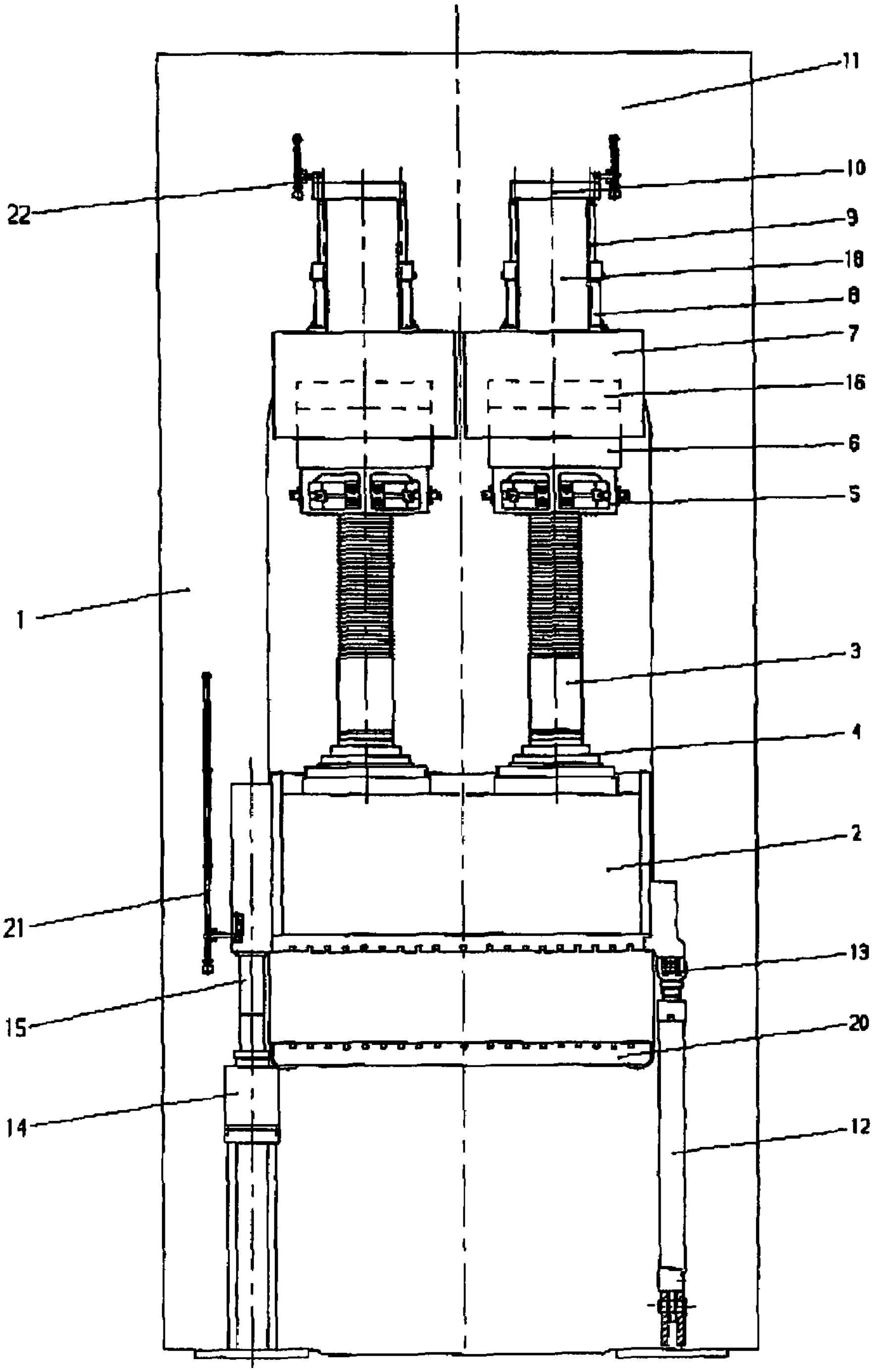
FIG. 1 shows a schematic side view of a hydraulic press with two working cylinders, according to an embodiment.

FIG. 1 shows a schematic side view of a hydraulic press in the open state with a press frame 1, a press table 20 rigidly arranged therein, and a press platen 2 movably arranged over it. Rapid motion cylinders 12 can be arranged laterally over platen connections 13 to provide rapid movement of the press platen 2. Above the press platen 2, depending on the execution and necessity, a connecting device 3 can be coupled in each case over a hydrostatic bearing 4, with the toothed rack being guided in a centric borehole of the piston 6 of the working cylinder 7. The connecting device 3 can be, for example, a toothed rack. The piston 6 can exhibit an extension 18 for a secure guiding of the connecting device 3 and at the same time protects the connecting device 3 against environmental impact.

Figure 2:
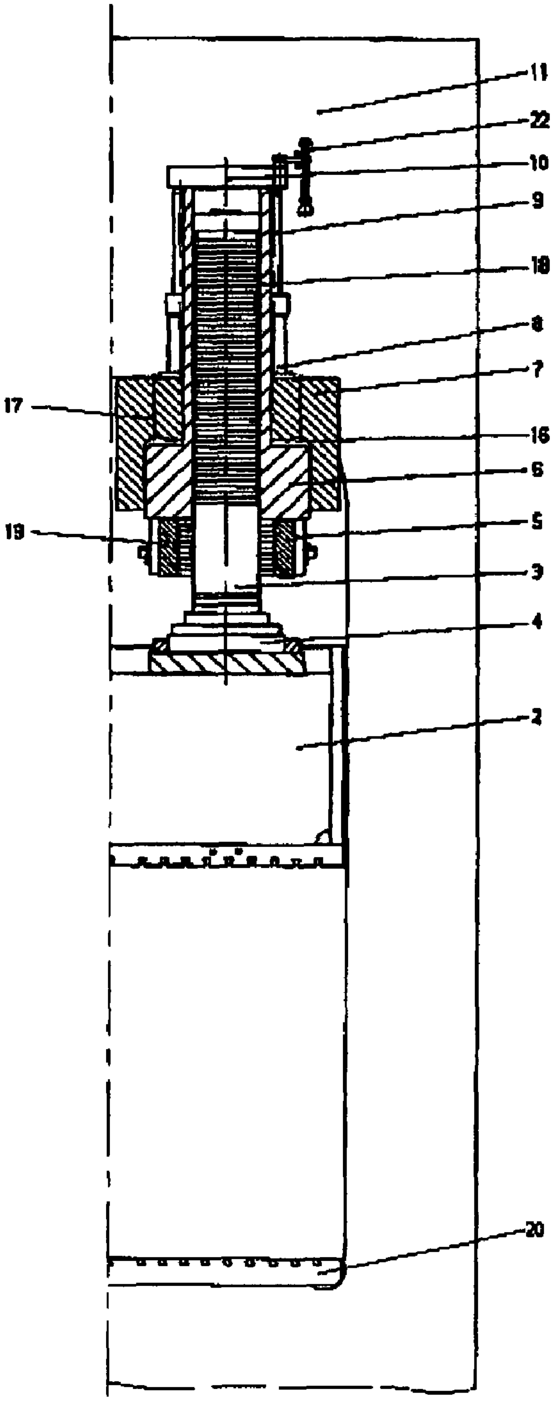
FIG. 2 shows a partial section, according to the FIG. 1, of the position of the working cylinder in the upper dead center with an open coupling device, according to an embodiment.

FIG. 2 shows an enlarged cross-sectional illustration of the press in an open state. The press can include a coupling device 5, which can be a coupling claw that is configured to engage with the connecting device. As shown in FIG. 2, the coupling device 5 is open and the piston 6 is in the upper dead center of the working cylinder. This can be achieved when the crosshead 10 pulls the extension 18, which is rigidly connected thereto, of the piston 6 via the piston chamber 8 of the positioning and synchronizing cylinders 9. Here, the working cylinder 7 can be rigidly connected to the upper crosshead 11 and the coupling device 5 can be rigidly connected to the piston 6. The closing procedure of the press can take place via the rapid motion cylinder 12, which moves the press platen 2 upwards via the platen connection 13.

Figure 3:
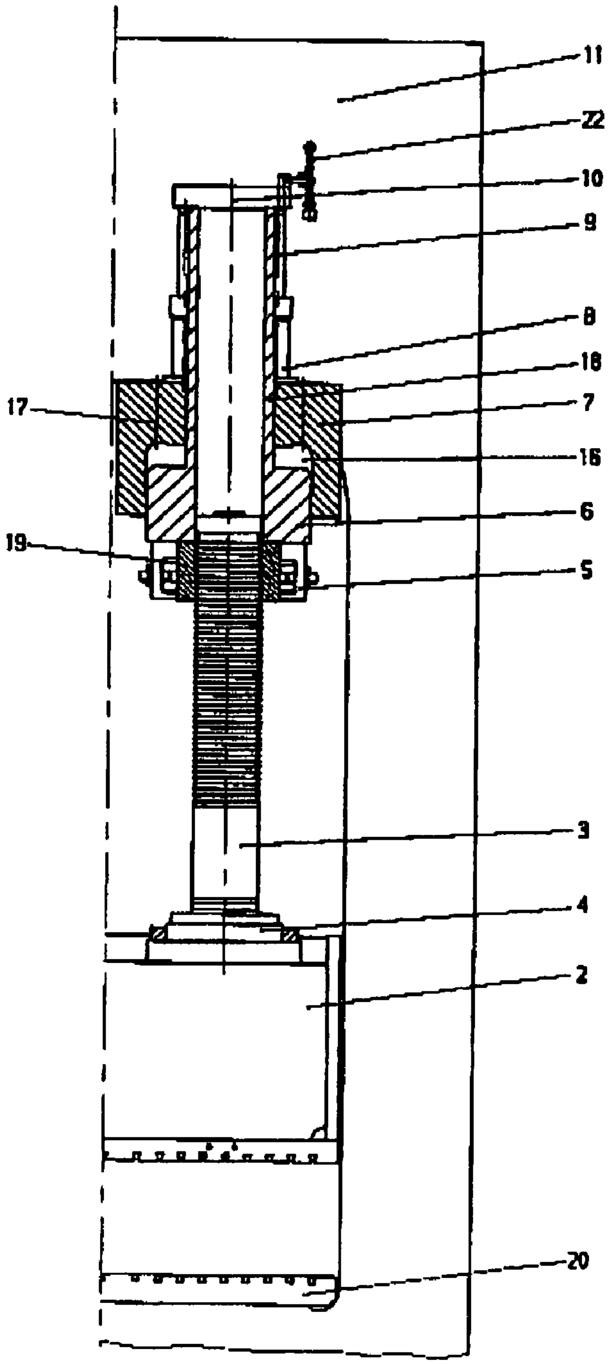
FIG. 3 shows a partial section, according to the FIG. 1, of the position of the working cylinder in the lower dead center with a closed coupling device, according to an embodiment.
Figure 4:
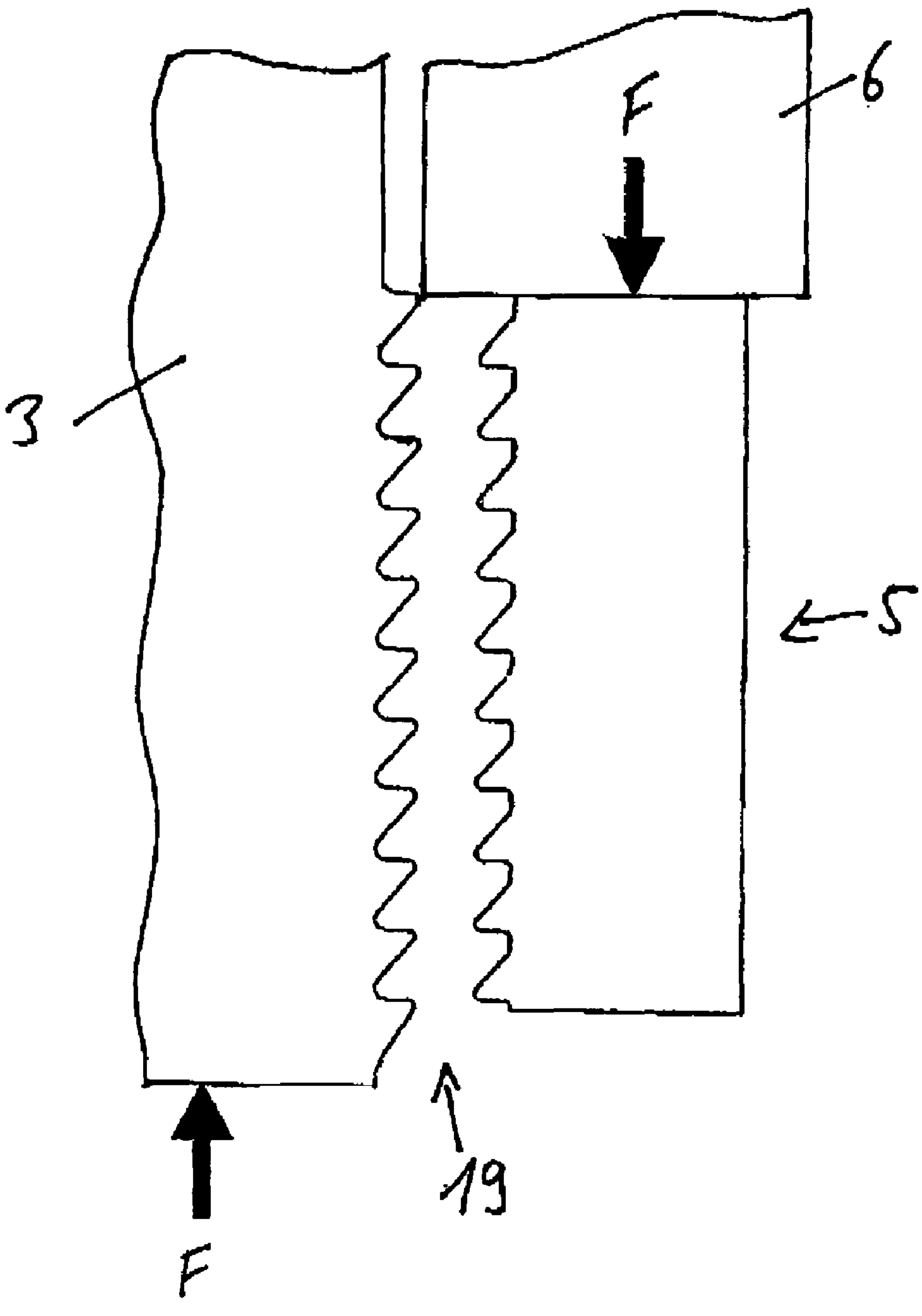
FIG. 4 shows a section through an open coupling device with an illustration of the catching elements according to FIG. 2, according to an embodiment.

Before tool or material contact or before reaching the parallel hold, made up of parallel holding cylinders 14 and the distance elements 15, the piston 6 can be first accelerated in order to synchronize it with the speed of the connecting device 3. This can be controlled through the positioning and synchronizing cylinders 9 and the rapid motion cylinders 12 in conjunction with appropriate position sensors. As soon as a synchronization is confirmed via position sensor devices 21 and 22, the coupling device 5 can be closed. For example, as shown in FIG. 4, the coupling device 5 and toothed rack 3 can be designed with catching elements 19 so that the grating of the coupling device 5 can catch with teeth of the toothed rack 3. According to an embodiment, this process must be completed before the system is clamped with the working cylinder 7 via the parallel holding cylinders 14 and working cylinder 7 starts the press process and pressure is built up in the piston chamber 16 via the connection 17, as shown in the example of FIG. 3. Accordingly, hydraulic core elements such as a hydraulic supply, hydraulic pumps, controls and many more must be provided, which are not illustrated.

After the press process and relief of the piston chamber 16, the coupling device 5 can be reopened and the press platen 2 can be again driven into the position of the upper dead center via the rapid motion cylinder 12 and the appropriate platen connection 13. At the same time, the piston 6 can again be transported to its upper end position via the positioning and synchronizing cylinders 9.

The compact design of the closing system can be developed independently of the press frame 1 or its crosshead 11. With respect to the opening stroke, work stroke and number of main cylinders, the closing system is likewise independent. Here, the coupling device 5 can rest directly on the piston 6, which with its extension 18 is executed as a tubular piston and is arranged in the working cylinder 7. The positioning and synchronizing cylinders 9 can rest on the working cylinder 7. The piston 6 can be brought to the coupling position during operation, as necessary, via the positioning and synchronizing cylinders 9, depending on the position of the press platen 2 or of the rapid motion cylinder 12. This can meet a prerequisite for the automatic adjustment of the press to variously pre-defined tool heights, without having to manually equip the press during a tool change. This can make energy savings possible through the short stroke of the working cylinder 7 with a low compression volume for a hydraulic long stroke press of more than 50%, as compared to a full hydraulic solution in which the stroke of the working piston corresponds to the opening stroke of the press platen.

Furthermore, a fast closing procedure of the press platen 2 can result from high closing speed, in conjunction with a pre-acceleration of the piston 6 of the working cylinder 7 until the synchronous motion with the connecting device 3 for the coupling process, and a short pressure buildup time due to lesser hydraulic oil compression. The coupling device 5 and the connecting device 3 can be used here only under pressure. This can result in only slight deviations of the forming pitch under force and it is not necessary to compensate through various splits or divisions in the component parts. This is accompanied by a high potential force density.

The arrangement of a hydrostatic bearing 4 between connecting device 3 and press platen 2 can result in a decoupling of the closing system with respect to eccentric moments. For example, moments from the process that affect the press platen 2 are not transmitted to the closing system. Furthermore, a compensation of the offset of the toothed rack connection of the connecting device 3 on the press platen 2 arises in a platen inclination because of the short guide length on the working cylinder 7 and the hydrostatic bearing 4.

Synchronization between the two moved main elements (press platen 2 and piston 6 of the working cylinder 7) can be regulated and monitored as follows: the stroke of the working cylinder 7, and consequently, the vertical position of the catching elements 19 of the coupling device 5 can be detected via the position sensor device 22. The stroke of the press platen 2, and consequently the vertical position of the connecting device 3, can be detected via the position sensor device 21. Two control loops can be monitored via automatic control (not shown). For one control loop, for example, the positioning and synchronizing cylinders 9 on the working cylinder 7 can form a control loop together with the position sensor device 22 and the appropriately necessary and interconnected hydraulic and electrical components. For another control loop, for example, a control loop can arise via the rapid motion cylinder 12 on the press platen 2 together with the position sensor device 21 and the appropriately necessary and interconnected hydraulic and electrical components. Through machine control, with the aid of the control loops and position information through the position sensor devices 21, 22, the specified coupling position can be run, depending on the tool height and product information and the corresponding way points for braking or accelerating, and synchronously held to one another over the distance necessary for coupling at a coupling time of less than 0.4 s.

According to an embodiment, the catching elements 19 for the toothed rack 3, as shown in the example of FIG. 4, preferably have a clearance in the vertical direction so that coupling can be assured should position deviations with respect to the determined actual values possibly occur. Deviations of the actual values to the information of the position sensor devices 21, 22 of connecting device 3 to the particular catching elements 19 beyond the tolerance range allowed can be monitored and recognized through a sensor (not illustrated).

In a further possible application of the press, it is conceivable for the piston 6 in the working cylinder 7 to be accelerated in the movement direction of the connecting device 3 shortly before contact, with the parallel hold affecting the closing movement of the press platen 2 made up of parallel holding cylinders 14 on the press frame 1 and the distance elements 15 arranged on the press platen 2, and at the same time the speed of the press platen 2 can be reduced by braking. Depending on a requirement, the remaining speed of the press platen 2 may be reduced to almost zero before the start of flux via the tool halves on the press table 20 and press platen 2. Here, the rapid motion cylinder 12 and/or the parallel holding cylinders 14 may be used.

In a further advantageous embodiment, the piston 6 in the working cylinder 7 can be accelerated in the movement direction of the connecting device 3 shortly before contact with the parallel hold affecting the closing movement of the press platen 2, the parallel hold being made up of parallel holding cylinders 14 on the press frame 1 and the distance elements 15 arranged on the press platen 2, in which the speed of press platen 2 is reduced at the same time by braking and the coupling device is closed after synchronization. In an alternative embodiment to this, the closing movement of the press platen 2 can be slackened shortly after contact with the parallel hold with a delaying effect, made up of parallel holding cylinders 14 on the press frame 1 and the distance elements 15 arranged on the press platen 2, with the piston 6 in the working cylinder simultaneously being accelerated in the movement direction of the connecting device 3 and the coupling device being closed after synchronization.

According to an embodiment, the parallel hold can assume the function of a damper and reduce the speed of the press platen 2 by braking in a controlled manner. In the process, it is also conceivable for the remaining speed of the press platen 2 to be reduced to almost zero before the start of the flux via the tool halves on the press table 20 and the press platen 2.

The priority application, German Patent Application No. 10 2006 015 022.8 filed on Mar. 31, 2006, is hereby incorporated by reference herein in its entirety.

Given the present disclosure, one versed in the art would appreciate that there may be other embodiments and modifications within the scope and spirit of the invention. Accordingly, all modifications attainable by one versed in the art from the present disclosure are to be included as further embodiments.

What is claimed is:

1. A hydraulic press for plastics or metal processing, comprising:

a press frame including a press table and a traveling press platen, at least one rapid motion cylinder with a platen connection, wherein the rapid motion cylinder is arranged for rapid no-load stroke of the press platen, at least one working cylinder with a piston configured to move toward the press table, a coupling device and at least one positioning and synchronizing cylinder for the piston of the working cylinder, wherein the coupling device and the positioning and synchronizing cylinder are arranged on the piston, a connecting device that is connected to the press platen, and a centrically arranged cylindrical extension for a sliding guide of the connecting device.

2. The hydraulic press of claim 1, further comprising a hydrostatic bearing configured to connect the connecting device to the press platen.

3. The hydraulic press of claim 1, further comprising at least one parallel holding cylinder arranged on the press frame and at least one distance element arranged on the press platen, wherein the parallel holding cylinder and the distance element are configured for a parallel hold of the press platen in relation to the press table.

4. The hydraulic press of claim 1, wherein the working cylinder comprises a differential cylinder.

5. The hydraulic press of claim 1, further comprising a sleeve arranged between the coupling device and the press platen for the connecting device.

6. The hydraulic press of claim 1, wherein the connecting device, a guide for the piston, and the centrically arranged cylindrical extension are encapsulated and provided with air filters.

7. The hydraulic press of claim 1, further comprising at least two control loops, wherein one control loop is formed from the positioning and synchronizing cylinder for each working cylinder and a position sensor device for each working cylinder, and another control loop is formed from the rapid motion cylinder and another position sensor device.

8. The hydraulic press of claim 1, further comprising at least two control loops, wherein one control loop for each working cylinder is formed with a position sensor device for each working cylinder, wherein another control loop is formed with the rapid motion cylinder and another position sensor device.

9. The hydraulic press of claim 1, wherein the working cylinder is rigidly arranged on an upper crosshead of the press frame.

10. The hydraulic press of claim 1, wherein the piston of the working cylinder forms the centrically arranged cylindrical extension.

11. The hydraulic press of claim 1, wherein the connecting device is a toothed rack.

12. The hydraulic press of claim 1, wherein the coupling device is a coupling claw.

13. The hydraulic press of claim 1, wherein the sleeve is telescopic or foldable.

14. A hydraulic press for plastics and metal processing, comprising:

a press frame including a press table and a traveling press platen, at least one rapid motion cylinder, wherein the rapid motion cylinder is arranged for rapid no-load stroke of the press platen, at least one working cylinder with a piston configured to move toward the press table, a connecting device that is connected to the press platen, and a coupling device arranged to couple with the connecting device, wherein the piston is configured to be accelerated in order to be synchronized with the connecting device, wherein the coupling device is configured to close with the connecting device when the synchronization occurs.

15. The hydraulic press of claim 14, further comprising at least one positioning and synchronizing cylinder, wherein the positioning and synchronizing cylinder and the rapid motion cylinder are configured to accelerate the piston of the working cylinder.

16. The hydraulic press of claim 14, wherein the coupling device is a toothed rack.

17. The hydraulic press of claim 14, wherein the piston of the working cylinder forms a centrically arranged cylindrical extension, wherein the centrically arranged cylindrical extension guides the connecting device.

18. The hydraulic press of claim 14, wherein the rapid motion cylinder is located laterally outside a periphery of the press platen.

19. The hydraulic press of claim 14, wherein the connecting device is located outside of a piston chamber of the working cylinder.

20. The hydraulic press of claim 1, wherein the rapid motion cylinder is located laterally outside a periphery of the press platen.

21. The hydraulic press of claim 1, wherein the connecting device is located outside of a piston chamber of the working cylinder.

* * * * *